Nov. 10, 1964   J. ROTH   3,156,748
METHOD FOR PRODUCING MOLDED ARTICLES OF SPONGE POLYURETHANE
Filed Nov. 7, 1961   2 Sheets-Sheet 1
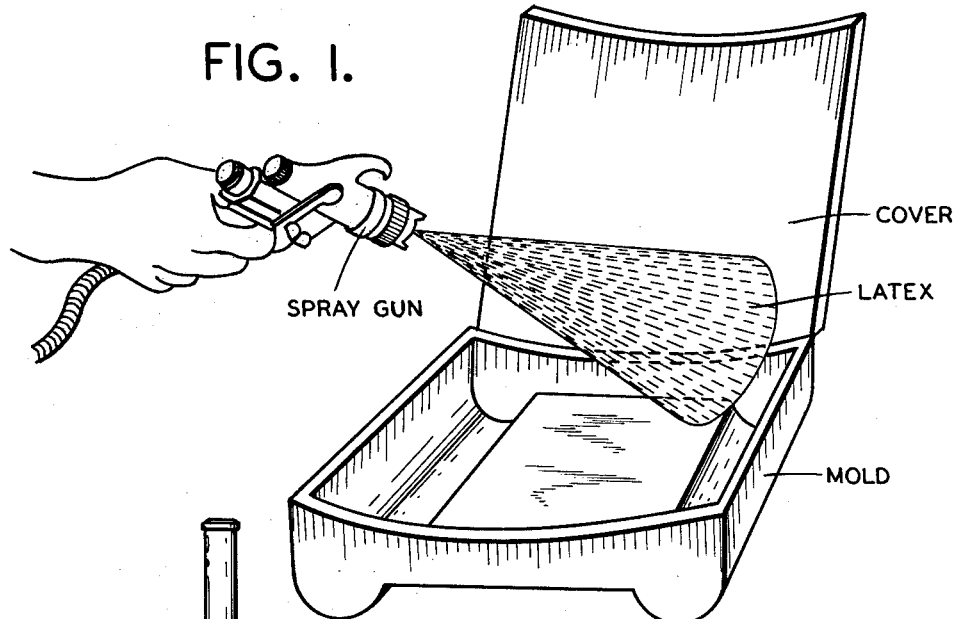
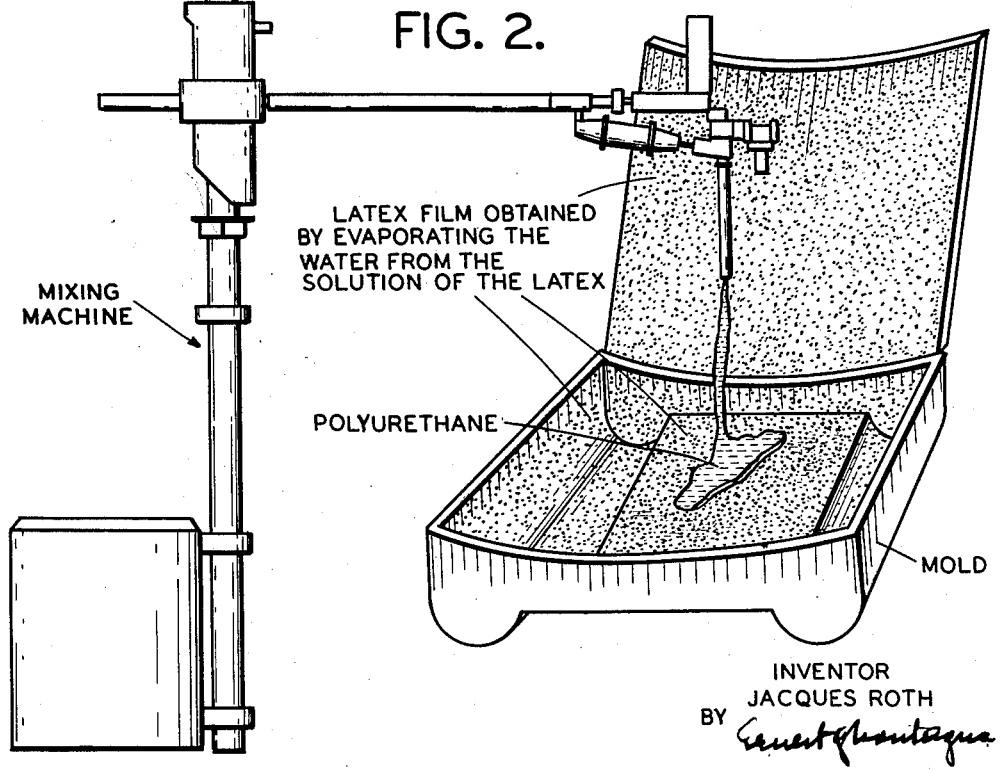
INVENTOR
JACQUES ROTH
BY *Ernest Montague*
ATTORNEY.

FIG. 3.
MOLD CLOSED AND FILLED WITH SPONGE POLYURETHANE
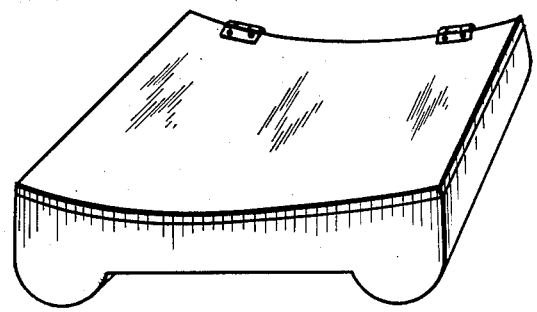
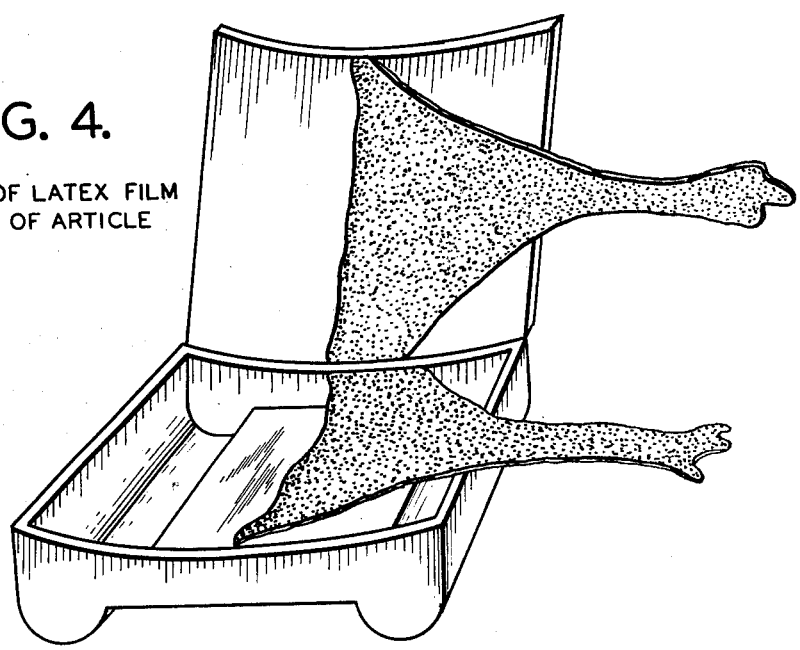
FIG. 4.
REMOVAL OF LATEX FILM
WITH SKIN OF ARTICLE
ARTICLE REMOVED FROM THE MOLD AND
COMPLETELY FREED FROM SKIN
FIG. 5.
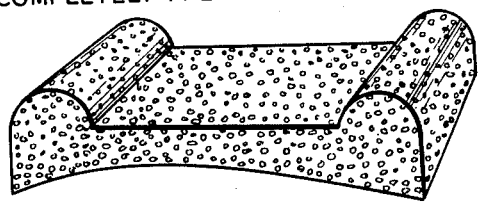
INVENTOR
JACQUES ROTH
BY
ATTORNEY.

United States Patent Office 3,156,748
Patented Nov. 10, 1964

3,156,748
METHOD FOR PRODUCING MOLDED ARTICLES
OF SPONGE POLYURETHANE
Jacques Roth, 27 Rue Erckmann Chatrian,
Strasbourg, Bas-Rhin, France
Filed Nov. 7, 1961, Ser. No. 150,629
Claims priority, application France, Nov. 9, 1960, 7,034
4 Claims. (Cl. 264—48)

The present invention relates to a method of producing molded articles of sponge polyurethane.

It is one object of the present invention to provide an improved method for molding articles of polyurethane sponge.

Methods for producing sponge polyurethane are conventional in the art and it is a well-known fact that articles made of such a sponge material may be obtained by direct molding of a mixture of isocyanate resin and activators cast in a mold which is closed and wherein the mixture expands, so as to form the desired sponge. The mold, when filled, should be kept for a certain time, say 25 to 40 minutes or more, inside a kiln after which it is opened and the sponge material which has assumed the shape of the mold is removed. The lifting is made possible, either by a preliminary coating of the inner surface of the mold with an adequate lifting reagent, such for instance, as paraffin, or else, through the coating thereof with a nonadhesive material, such as that sold under the registered trade name "Teflon."

Now, the kiln treatment is a comparatively lengthy operation and the surfaces of the molded articles show a sort of skin which reduces considerably the yieldingness and, consequently the comfort provided by the sponge material, chiefly when the molded articles are to serve as cushions or for like purposes.

It is therefore another object of the present invention to provide a method of producing molded articles of sponge polyurethane wherein the formation of a skin is prevented and it has been found in fact, that, if the mold is opened after only a few minutes, say 5 to 7 minutes of kiln treatment at 100° C., the molded material is removed easily, since it has been subjected to only a reduced rate of polymerization, while the skin remains adherent to the inner surfaces of the mold and of the cover. The article may then be left in the kiln during 5 to 10 minutes more, depending on the temperature of the kiln and the polymerization is thus brought to a finish under excellent conditions.

However, in such a case, there is encountered a serious drawback, since the skin remains adherent to the bottom of the mold and adheres energetically thereto in spite of the presence of the special lifting reagent or of the coating applied over the inner surface of the mold and it is, therefore, necessary before reusing the mold to resort to a cleaning and scraping operation which is extremely expensive.

It is, therefore, still another object of the present invention to provide a method of producing molded articles of sponge polyurethane, which removes this drawback and which eliminates the necessity of this objectionable cleaning operation by bringing a simple and cheap improvement to the method of producing molded articles of sponge polyurethane.

It is yet another object of the present invention to provide a method of producing molded articles of sponge polyurethane, wherein the inner surfaces of the mold and of the cover thereof are lined at first with a film produced beforehand, or else, with a film formed in situ through the application with a brush or a gun of a suitable material adapted to form a base for the objectionable parasitic skin which separates from the molded article after a short time of kiln treatment inside the closed mold, the system including the skin and the cooperating film being such as will allow an instantaneous and easy removal out of the mold.

With these and other objects in view, which will become apparent in the following detailed description, the present invention will be clearly understood in connection with the accompanying drawings, in which:

FIGURE 1 is a perspective view of a mold in open position with a spray gun applying a latex film to the inner walls of the mold;

FIG. 2 is a perspective view of the mold disclosed in FIG. 1 after application of the latex film and feeding now polyurethane into the mold;

FIG. 3 is a perspective view of the mold in closed position after filling the same with polyurethane;

FIG. 4 is a perspective view of the mold indicating the removal therefrom of the latex film having adhered thereto the skin of the sponge polyurethane; and FIG. 5 is a perspective view of the molded article removed from the mold without the skin.

The base film consists, preferably, of a solution of natural or synthetic rubber latex, paper pulp, or plastic material of similar properties applied in a liquid form e.g. after dispersion or dissolution thereof, so that the liquid thus applied may dry and form the desired film.

A similar film produced beforehand, may be applied over the inner surfaces of the mold and of the cover through the action of vacuum or the like means.

The improvements brought about by the present invention allow thus reducing, on the one hand, the duration of the kiln treatment of the mold, and, what is more important, on the other hand, furthering the easy reuse of the mold, the film applied against the mold surfaces to which the skin produced in the molding adheres, being readily removed without any difficulty within a few seconds.

While I have disclosed several embodiments of the present invention, it is to be understood that these embodiments are given by example only and not in a limiting sense, the scope of the present invention being determined by the objects and the claims.

I claim:
1. In a method of molding articles of sponge polyurethane by means of polymerization of its components in a heated mold, said method tending to form a skin on the polyurethane article, the steps of
   applying to the inner walls of a mold a solution of a material adhering to said skin formed on said article,
   removing the solvent of said solution to form a dry base film on the inner walls of said mold,
   feeding polyurethane sponge material into said mold to form a molded article and subjecting said sponge material to a temperature of about 100° C. for a time period of about 5 to 7 minutes in order to obtain a preliminary polymerization,
   removing said molded article from said mold without said skin formed thereon,
   removing said base film jointly with said skin formed on the outside of said molded article and adhering to said base film, and
subjecting said molded article to a second heating for a final polymerization.

2. The method, as set forth in claim 1, wherein said step of applying said base film is performed by brushing said solution on the inner walls of said mold.

3. The method, as set forth in claim 1, wherein said step of applying said base film is performed by spraying said solution on the inner walls of said mold.

4. The method, as set forth in claim 1, wherein said step of applying said base film is performed by urging said solution on the inner walls of said mold by subjecting the latter to vacuum.

References Cited by the Examiner
UNITED STATES PATENTS

| | | | |
|---|---|---|---|
| 2,213,902 | 9/40 | Daniels | 18—47 |
| 2,629,135 | 2/53 | Johnson | 18—47 |
| 2,693,006 | 11/54 | Shigekawa | 18—47 |
| 3,012,287 | 12/61 | Tucker | 18—47 |
| 3,016,575 | 1/62 | Ebneth | 18—53 |

ALEXANDER H. BRODMERKEL, *Primary Examiner.*

ROBERT F. WHITE, *Examiner.*